6554X
J. Ambler, Jr.,
Portable Soda Fountain.
Patented June 13, 1831.
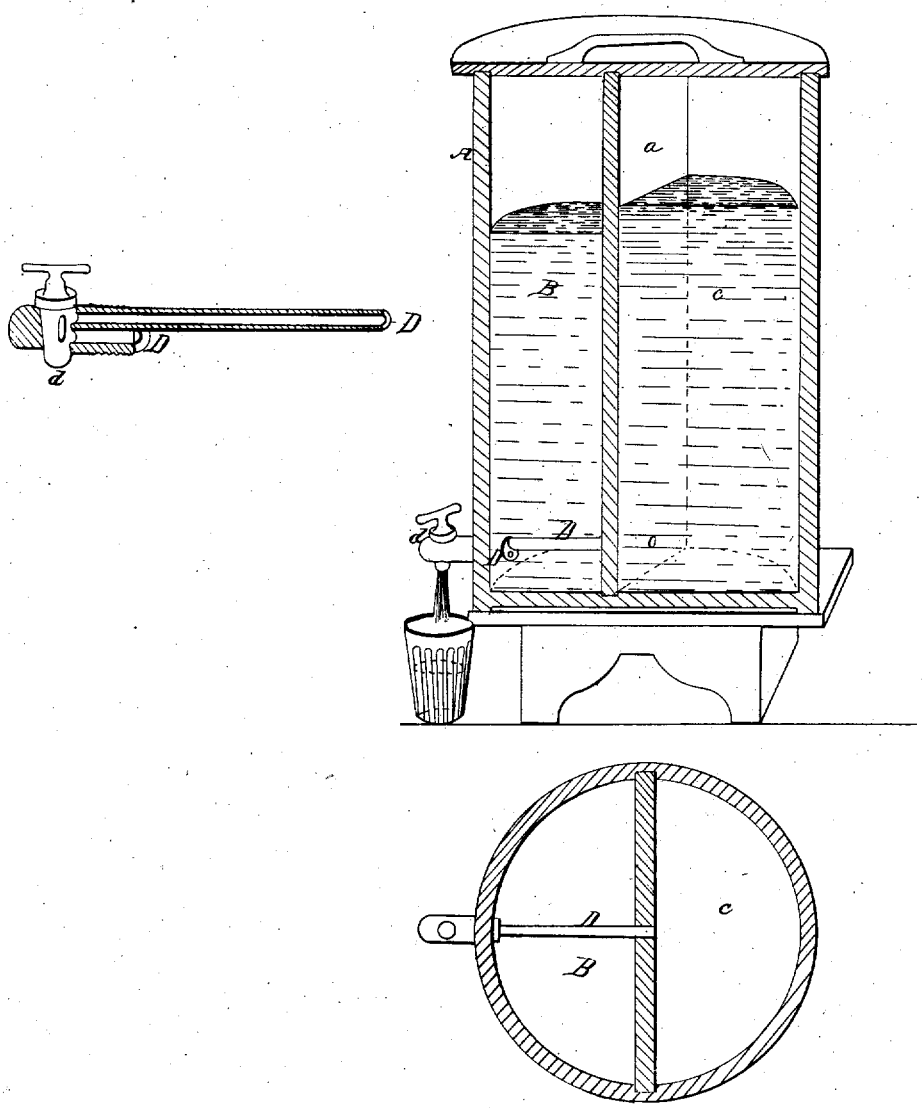
N. PETERS, PHOTO-LITHOGRAPHER, WASHINGTON, D. C.

6/13/1831 6331X

June 13, 1831

D. John Ambler Jr Chenango N.Y.

Letters Patent

The Schedule referred to in these Letters Patent and making part of the same containing a description in the words of the said John Ambler Jun. himself of his improvement in the apparatus for making Soda Water Be it known that I John Ambler Jun. have invented an apparatus for making Soda Water by mixing the separate solutions in the act of drawing off the liquid and that the following is a full and exact description of the same.

I make a Cistern or reservoir which I divide into two parts by a partition across the same or I make two reservoirs and place them together so that they shall answer the same purpose. Into one of the Compartments is put a solution of tartaric acid or any other suitable acid and into the other a solution of the super or bi-carbonate of soda usually in the proportion of about five parts of the former to six of the latter, which two solutions are to be mixed in the act of drawing which produces an active effervescence in the receiving vessel. To draw off these liquids I use a Stop cock in the Shank of which there are two perforations one above the other a tube from one is connected with the acid and the other with the saline solution. The opening in the key of the cock is made oblong so as to allow the liquids to combine in it & flow out together.

Instead of the Stop cock I sometimes substitute two valves closing the openings in the cistern. Then the openings are to be connected by tubes uniting together & having an adjutage common to both. The stems of these valves are to be so connected that by sliding pressing or turning a button or other contrivance they shall act simultaneously.

What I claim as my invention and for which I ask a Patent is the employment of a Stop cock with the openings in the Shank a little apart over each other as above described and also the substitution of valves operated upon by a single movement in any of the ways familiar to machinists

Witnesses [illegible] [illegible] John Ambler Jun.
[illegible] [illegible] [illegible]